US010752165B2

(12) United States Patent
Omanovic (10) Patent No.: US 10,752,165 B2
(45) Date of Patent: Aug. 25, 2020

(54) VEHICLE SIGNAL

(71) Applicant: Panasonic Automotive Systems Company of America, division of Panasonic Corporation of North America, Peachtree City, GA (US)

(72) Inventor: Edo Omanovic, West Bloomfield, MI (US)

(73) Assignee: Panasonic Automative Systems Company of America, division of Panasonic Corporation of North America, Peachtree City, GA (US)

(*) Notice: Subject to any disclaimer, the term of this patent is extended or adjusted under 35 U.S.C. 154(b) by 399 days.

(21) Appl. No.: 15/487,111

(22) Filed: Apr. 13, 2017

(65) Prior Publication Data

US 2018/0093607 A1   Apr. 5, 2018

Related U.S. Application Data

(60) Provisional application No. 62/321,889, filed on Apr. 13, 2016.

(51) Int. Cl.
*B60K 35/00* (2006.01)
*B60Q 1/00* (2006.01)
*B60Q 1/34* (2006.01)
*B60Q 1/22* (2006.01)
*B60Q 1/50* (2006.01)
*B60Q 9/00* (2006.01)

(52) U.S. Cl.
CPC ............. *B60Q 1/34* (2013.01); *B60Q 1/22* (2013.01); *B60Q 1/50* (2013.01); *B60Q 9/008* (2013.01); *B60Q 2400/50* (2013.01)

(58) Field of Classification Search
CPC ........ B60Q 2400/50; B60Q 1/22; B60Q 1/34; B60Q 1/50; B60Q 9/008
See application file for complete search history.

(56) References Cited

U.S. PATENT DOCUMENTS

| | | | |
|---|---|---|---|
| 9,616,802 B1* | 4/2017 | Kiriyama | B60Q 1/0023 |
| 2014/0028980 A1* | 1/2014 | Othmer | B60Q 1/50 353/14 |
| 2015/0224926 A1* | 8/2015 | Mochizuki | B60R 1/00 701/36 |
| 2017/0210282 A1* | 7/2017 | Rodriguez Barros | G03B 21/00 |

OTHER PUBLICATIONS

Moon, Mariella, Mitsubishi's Turn Signals of the Future Are Projected on the Road, Engadget, Transportation Section, Oct. 10, 2017, Website: https://www.engadget.com/2017/10/10/mitsubishi-road-projections-turn-signals/.

* cited by examiner

*Primary Examiner* — Georgia Y Epps
*Assistant Examiner* — Jacob R Stern
(74) *Attorney, Agent, or Firm* — Laurence S Roach, Esq.

(57) ABSTRACT

A visual signal system for a vehicle projects a shaped light symbol onto the ground. For example, a visual signal system for a vehicle can include a light source configured to project light outside of a vehicle. In an example, the visual signal system can also include a ground projection adjustor configured to adjust the light source to be a projection of light on the ground. In an example, the visual signal system can also include a connection interface configured to transmit instructions to the ground projection adjustor and the light source.

30 Claims, 5 Drawing Sheets

400
FIG. 4

VEHICLE SIGNAL

CROSS-REFERENCED TO RELATED APPLICATIONS

This application claims benefit of U.S. Provisional Application No. 62/321,889 filed on Apr. 13, 2016, which the disclosure of which is hereby incorporated by reference in its entirety for all purposes.

FIELD OF THE INVENTION

The present disclosure generally relates to signal systems in a vehicle. More specifically, the present disclosure relates to visual signal systems projected from a vehicle.

BACKGROUND OF THE INVENTION

This section is intended to introduce the reader to various aspects of art, which may be related to various aspects of the present disclosure, which are described and/or claimed below. This discussion is believed to be helpful in providing the reader with background information to facilitate a better understanding of the various aspects of the present disclosure. Accordingly, it can be understood that these statements are to be read in this light, and not as admissions of prior art.

Vehicles, such as cars, trucks, sport utility vehicles (SUVs), minivans, and boats, among others, can have systems that provide signals that can be for the benefit of other vehicles, drivers, pedestrians, cyclists, animals in a roadway, or any device that can interact with a vehicle. For example, a first vehicle can have brake lights that alert a driver in a second vehicle when the first vehicle has its brake pedal applied. This can allow the driver in the second car to react appropriately so as not to collide with the first vehicle.

The present disclosure presents techniques to add visual signal systems including using lighting systems to project intended actions onto the road. For example, a car could have ground facing lights that activate upon the use of a turn signal by the driver. The use of the turn signal by the driver could result in an arrow shape area of light being projected on to the road in the direction of a driver's intended or indicated movement. This additional visual signal system could more effectively catch a second driver's attention, convey an action or potential action, reduce potential for blind spots, and indicate targets of interest.

SUMMARY OF THE INVENTION

One example can include a visual signal system for a vehicle, method for similar, or a vehicle itself with several of the following features discussed. An example can include a light source configured to project light outside of a vehicle. The visual signal system can include a ground projection adjustor configured to adjust the light source to be a projection of light on the ground. A connection interface can be configured to transmit instructions to the ground projection adjustor and the light source. In an example, the projection of light comprises at least one of length, width, shape, and any combination thereof, to be adjusted by the ground projection adjustor, and the projection of light is shaped like an arrow, stop sign, circle, yield symbol, and any combination thereof, to be adjusted by the ground projection adjustor.

In an example, the visual signal system can include a detector to transmit a blind-spot notification if a second vehicle is detected as being in a position relative to the vehicle wherein the projection of light is not visible. In an example, a secondary light source is activated based on the detector transmission, where the secondary light source displays a secondary projection of light in a second location on the ground. In an example, the ground projection adjustor moves the projection of light and/or the light source, to project the projection of light into an available space outside the blind-spot.

In an example, the connection interface processes a received instruction for a projection of light containing a relative location around the vehicle and/or longitude and latitude coordinates of a target of interest in a path of the vehicle. Further, in an example, the light source can be located in a rear of the vehicle and projects a stop symbol on the ground when the vehicle is braking. In an example, the light source is located in the rear of the vehicle and projects a yield animation symbol on the ground when the vehicle is in reverse. An example can also include the light source being a vehicle light adjusted by the ground projection adjustor to project symbols on the ground.

In an example, the ground projection adjustor can be rigid, manually adjustable, mechanically adjustable, adjustable through vehicle power, adjusted through a processed instruction received at the connection interface, or any combination thereof. In an example, the connection interface processes a received instruction from the mobile device, the received instruction comprising a location for the light source to generate the projection of light on the ground, wherein the location for the light source is based on a mobile location system.

BRIEF DESCRIPTION OF THE DRAWINGS

The above-mentioned and other features and advantages of the present disclosure, and the manner of attaining them, will become apparent and be better understood by reference to the following description of one example of the disclosure in conjunction with the accompanying drawings, wherein:

FIG. 3A and FIG. 3B are drawings of visual signal systems where

Correlating reference characters indicate correlating parts throughout the several views. The exemplifications set out herein illustrate examples of the disclosure, in one form, and such exemplifications are not to be construed as limiting in any manner the scope of the disclosure.

DETAILED DESCRIPTION OF EXAMPLES

One or more specific examples of the present disclosure can be seen below. In an effort to provide a concise description of these examples, not all features of an actual implementation are described in the specification. It can be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it can be appreciated that such a development effort might be complex and time consuming, and is a routine undertaking of design, fabrication, and manufacture for those of ordinary skill having the benefit of this disclosure.

Exemplary examples of the present disclosure relate to a vehicle with front headlamps that can contain a light source. The light source can project an arrow shape projection of light onto the road next to the vehicle on the side the driver of the vehicle intends on merging based on a driver input, for example, the movement of a turn signal switch. In an example, if a vehicle is detected in the path of this projection, the system can switch to a secondary light source located in the side view mirror that will do the same in a different location unobstructed by another vehicle. In bad weather situations that reduce visibility, the impact of detailed projections of light on the roadways can be obscured as direct visual channel to a signal may be less easily accomplished. The light from the extra visual signal system may still warn other drivers of a nearby vehicle potentially merging as these signals, while obscured, still provide light on a road to indicate the presence of a vehicle.

Presently, turn signals may only be visible at the back of the vehicle or on the side mirrors of a car and not on the road itself. In the present disclosure, the disclosed visual signaling system can project a visual signal, such as an arrow, slightly in front of the vehicle. In an example, the location the projection can be modified to ensure display of the projection in locations unlikely to have blind spots for drivers. Through the present disclosure, the projection of light can alert nearby drivers very clearly of a signaling driver's intention to merge.

A number of various light sources could be used to create these projections of light including separate Light Emitting Diodes (LEDs). The LEDs could be used to give the arrow a different color onto the road. Another light source could use Digital Light Processing (DLP) Headlamps. Through the use of DLP headlamps and adjustable mirrors, the resolution of a projected shape could be effected. In an example, lasers could be used as well. Systems of protection could be put in place wherein the lasers were not enabled when a vehicle was parked, the lasers could be locked pointed towards the ground, or through selective location of mounting the system.

In an example, the projection can be arrows to correspond to turn signals, slowing and stopping signals, reversing signals or animations, identification of a target of interest such as a destination or an obstruction in vehicles path. The location of the light source's placement and number can vary as well. For example, the light sources to emit light creating a projection could be a part of a headlamp, headlamp assembly, tail lights, movable assemblies on the corners of the car, placed on side view mirrors, installed center in the front and rear of the vehicle, or external areas of a vehicle including any combination of these areas.

In an example, the visual signal system could include connecting and projecting images based on a connected processing device with a location system, such as a global positioning system (GPS). In this example, a particular turn could correspond to the connected directions. In an example, particular turns, exits from highways, or even navigation based lanes based on traffic patterns could be marked visually on the road by use of the projections of light from the vehicle. In an example, if a target of interest, such as a driver destination, were detected by the vehicle or identified by a processing device, the visual signal system could mark that particular location with a projection of light. For example, if the car detected an obstacle in the road such as debris, a pedestrian, or an animal crossing the road, the visual signal system could mark a space near the target of interest so that the driver could be visually warned. If a target of interest, such as a café or restaurant is being navigated to, as the vehicle approaches the destination the visual signal system could indicate on the road with a projection of light the target of interest, or a direction of the target of interest. Similar projections of light on the road and connection to a processing device could be used to visually guide a car and driver to an empty parking spot, for example.

Figure 1:
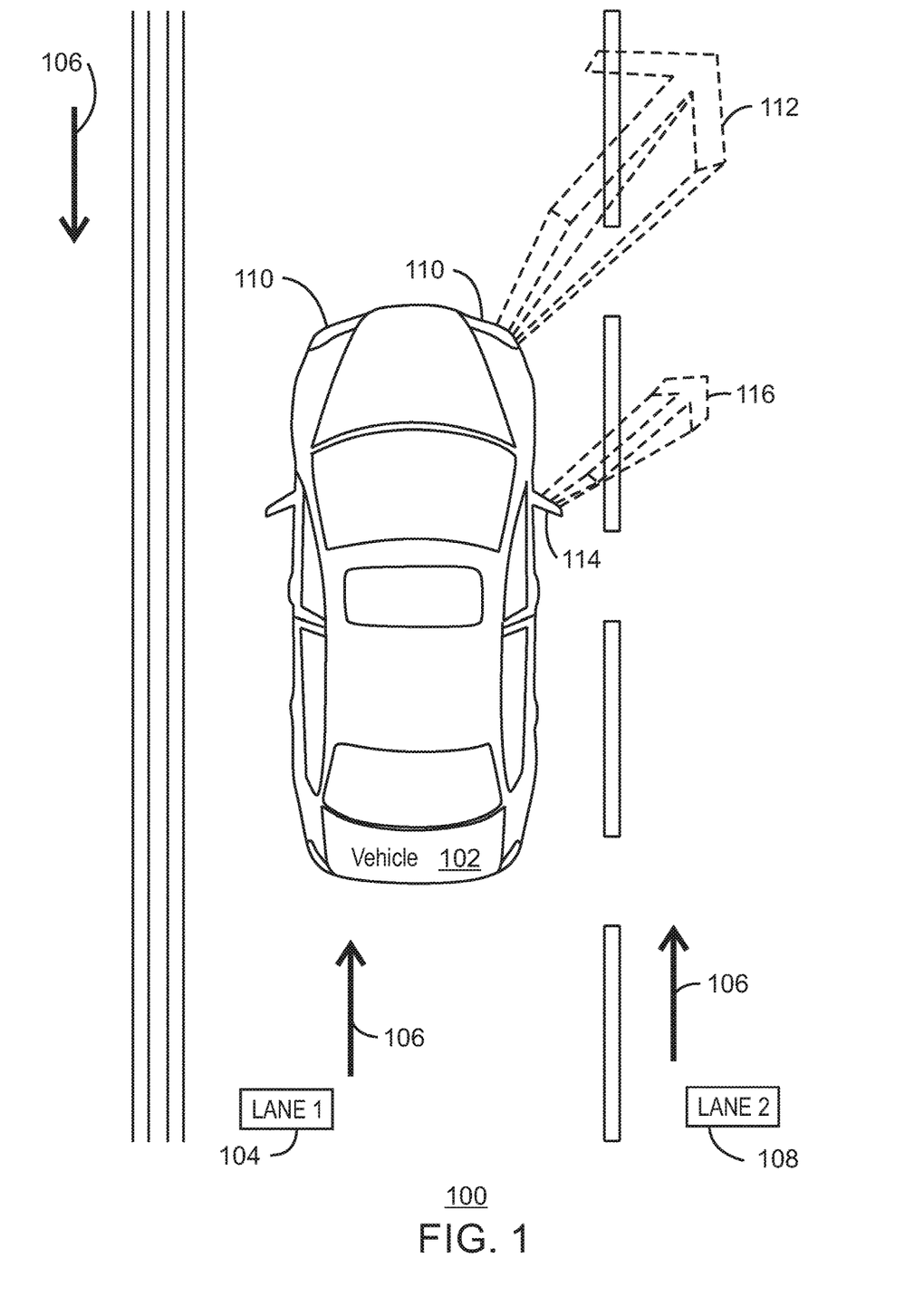
FIG. 1 is a drawing of an example vehicle implementing the visual signal system to indicate a lane change.

FIG. 1 is a drawing of an example vehicle implementing the visual signal system 100 to indicate a lane change. FIG. 1 includes a vehicle 102, that can be seen driving forward in lane 1 104. The direction and flow of traffic 106 is the same for lane 1 104 and lane 2 108, while across the double lines, the flow of traffic 106 is pointed the opposite direction.

Depending on the chosen path of a driver in the vehicle 102, a lane change may be signaled if the driver is moving from lane 1 104 to lane 2 108. During this lane change, the driver can operate a mechanical switch by controlling or toggling the turning signal switch. When turning, the vehicle 102 lights can blink as headlights 110 and tail lights on the side closest to the lane the driver of the vehicle 102 may soon be entering.

A projection of light 112 can be made from the visual signal system, shown as coming from one of the headlights 110 in this example. As seen in FIG. 1, the projection of light 112 is shaped like an arrow, although the shape itself can be modified by a ground projection adjustor. The ground projection adjustor can be a rigid material shaped simply as a cutout arrow for use as road projected turn signals, and can provide adjustment options to the projection of light. In an example, the projection of light can be a number of shapes, lengths, and intensities based on a how much or little a ground projection adjustor filters, shades, obstructs, or guides a light source in the visual signal system to adjust the projection of light. The arrow shaped projection of light 112 seen in FIG. 1, can be seen as an example for the vehicle 102 changing lanes where the projection of light corresponds to a turn signal activated by the driver. Upon activation of the turn signal, the arrow shaped projection of light 112 could warn another car in lane 2 108 of the vehicle 102's next move in a more visual way than a taillight could accomplish.

As discussed above, the light sources for the visual signal system could vary between LEDs, lasers, and other suitable light sources. While some are suitable for day and night use, other light sources may be beneficial during the day. The present disclosure regards day and night use as able to make use of light sources bright enough to help make the roads safer. Although a second vehicle is not shown in FIG. 1, a second rearview mirror and with a secondary light source 116 may be included.

If an obstacle or another vehicle were in the way of the arrow shaped projection of light 112, it could be unlikely for the second vehicle to view the symbol and determine the best action to take. Accordingly, a sensor or number of sensors can be added to the vehicle 102 to detect when a vehicle or other obstacle may be in a projection path, or similarly, the projection location may be in a vehicle's blind-spot. If either an obstacle is the in the way of a projection, or the projection may be in a blind-spot location, the secondary light source can be used to project a secondary projection of light on a second location of the ground. While two locations and the secondary light source are here discussed, a number of additional and alternative lights can be used to increase visibility and function. In an example, the secondary light source can be located on a side-view mirror 114 when the light source 110 may be located within at least one of the headlight 110 or tail light wells of the vehicle 102.

Figure 2:
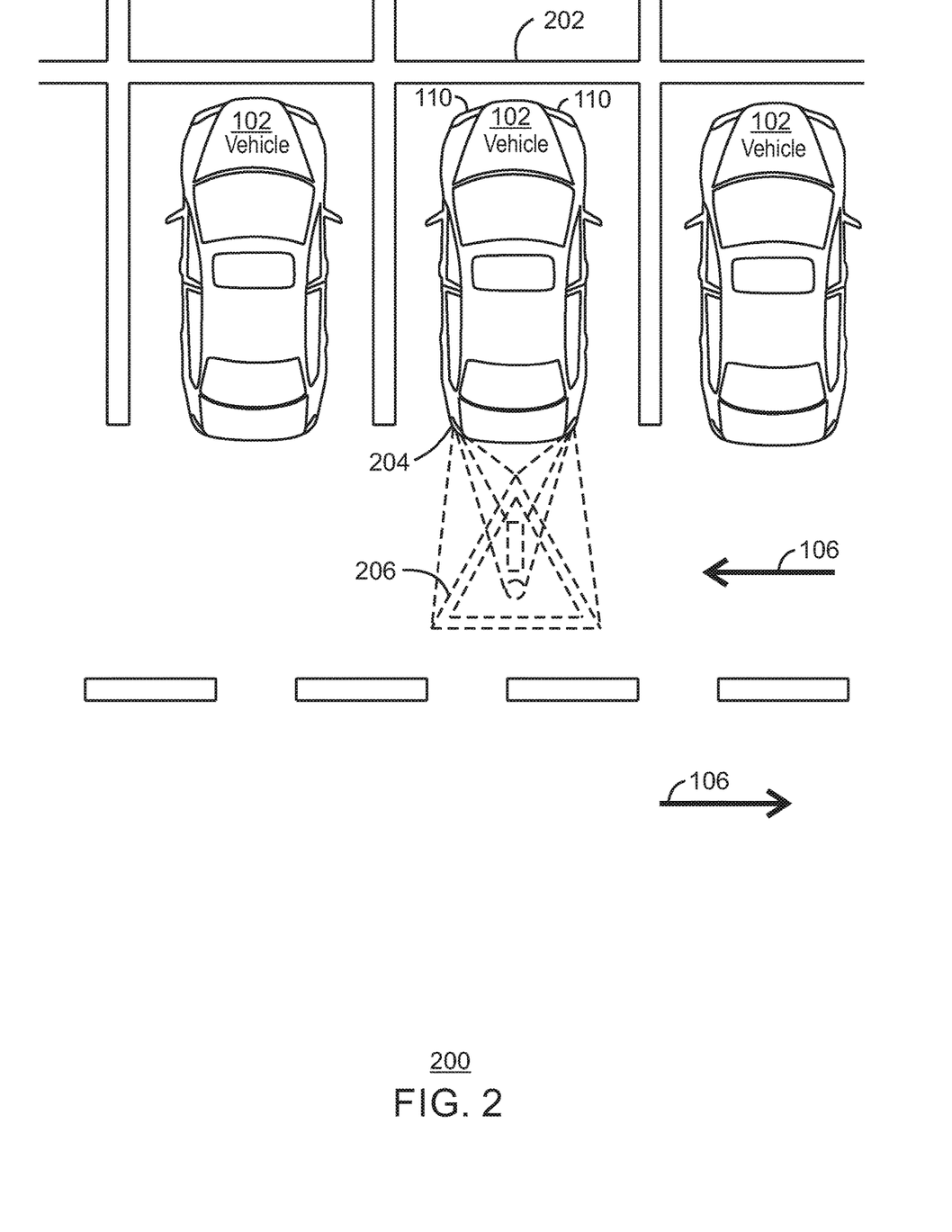
FIG. 2 is a drawing of an example interaction system for a vehicle showing a visual signal system deployed from the back of a vehicle to indicate a warning that the vehicle is backing up.

FIG. 2 is a drawing of an example interaction system 200 for a vehicle 102 showing a visual signal system deployed from the back of a vehicle 102 to indicate a warning that the vehicle 102 is backing up. Like numbered items are as described with respect to FIG. 1.

In FIG. 2, three vehicles 102 are pictured in a parking grid 202. The middle vehicle 102 may have headlights 110 capable of deploying the visual signal system of FIG. 1. However, the front-facing headlights may not be able project an image on the ground in a useful way when backing into traffic. As in FIG. 1, the traffic 106 can be indicated by the drawn arrow of FIG. 2 and indicates the direction of traffic in a particular lane. As there is little visibility for a vehicle 102 when backing into oncoming traffic, one use of the visual signal system could be to provide a projection of an image from a tail light 204 or tail lights 204.

In FIG. 2, tail lights 204 include light sources that, when guided by the ground projection adjustor, can project a particular shape, symbol, color, or intensity. The visual warning sign 206, such as a yield sign, appearing on the road could provide an extra warning to oncoming traffic while avoiding exposing a blind surface of the backing vehicle 102. In an example, a static symbol for a projection of an image could be instead animated to show direction of movement, or other suitable animations to draw attention or convey a message.

Figure 3A:
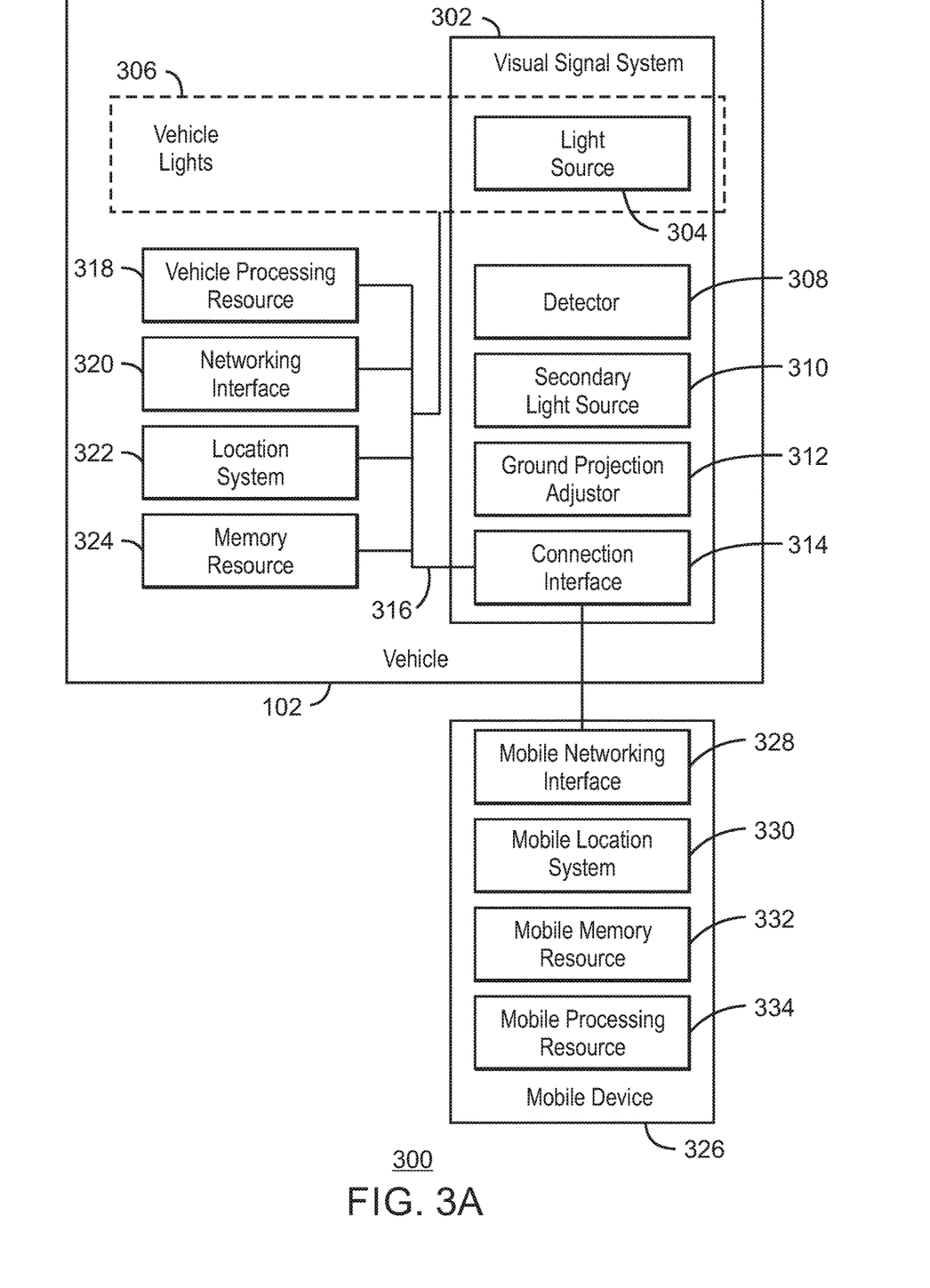
FIG. 3A shows several components that can be included and FIG. 3B shows a simplified diagram of the visual signal system.
Figure 3B:
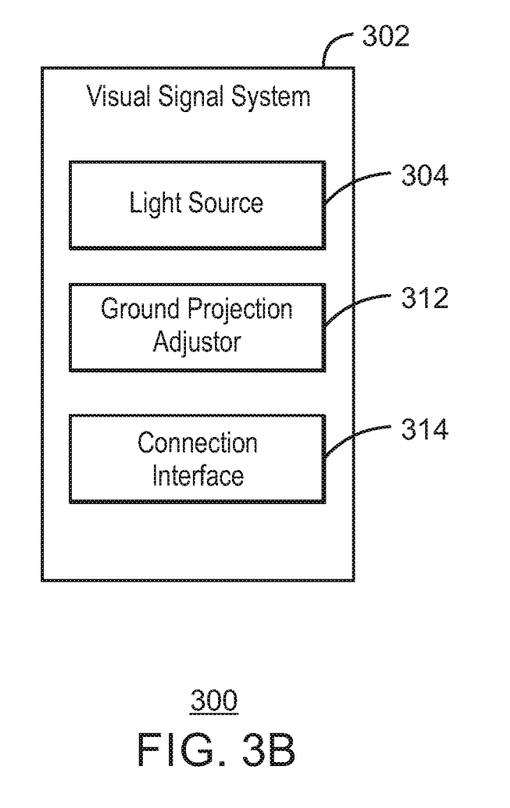

FIG. 3A and FIG. 3B are drawings of visual signal systems where FIG. 3A shows several components 300 that can be included and FIG. 3B shows a simplified diagram of the visual signal system. Like numbered items are as described with respect to FIG. 1.

In FIG. 3A, the vehicle 102 can include a visual signal system 302. The visual signal system 302 can include a light source 304 which can be separate stand-alone lights or can be lights already installed in the vehicle 102 such as vehicle lights 306 like headlights, taillights, break lights, emergency lights, etc. The visual signal system 302 can also include a detector 308. The detector 308 can be a single detector 308 or a number of detectors 308. The detector 308 can be a proximity detector or a simple camera system to determine if another car or obstacle is in a particular location. In an example, a number of detectors 308 are used around the vehicle 102 to determine if the projection of light on the ground can be located correctly wherein it avoided blindspots and did not interfere with other vehicles, drivers, or pedestrians. The visual signal system 302 can also include a secondary light source 310 that can be used in correspondence with the detector 308 to alternatively provide a projection of light in a particular ground location. In an example, the secondary light source 310 can be located on a side-view mirror when the light source 304 is located within at least one of the headlight or tail light wells of the vehicle 102. The visual signal system 302 can include a ground projection adjustor 312 to adjust the light source 304 and potentially the light source 304 to be directed to a particular ground location, to be shaped as a particular projection of light. In an example, the ground projection adjustor 312 can make a projection of light shaped like an arrow, a circle, a stop sign symbol, a yield symbol, and other symbols related to road traffic. Further, the ground projection adjustor 312 can provide a static projection of light, in the form of a symbol, color, or intensity. The visual signal system 302 can also include a connection interface 314, to interface with at least one of other vehicle 102 components through a bus 316. The bus 316 can be a data transmission line, trace, even a wireless data connection as long as it allows communication between electric components such as those shown in FIG. 3A.

The bus 316 can connect the visual signal system 302 to a vehicle processing resource 318, a networking interface 320, a location system 322, and a memory resource 324. The processing resource 318 can be a central processing unit inside the vehicle 102 and can process and provide instructions based on received input from the other components and from stored instructions in the memory resource 324. The networking interface 320 can be an interface to a larger network beyond the vehicle 102, such as the internet, or an intranet of other cars or vehicles or sensors outside the vehicle 102. The location system 322 can include positioning technology including use of global satellites to identify positions in longitude and latitude for navigation. The memory resource 324 can be solid state memory or a hard-drive or any other means of storing data and instructions for the vehicle processing resource 318.

The bus 316 can connect the visual signal system 302 to a mobile device 326 with corresponding components. The mobile device 326 can include a mobile networking interface 328, a mobile location system 330, a mobile memory resource 332, and a mobile processing resource 334. The mobile device 326 can be a mobile phone, visual signal system 302 mobile device, a tablet, a laptop or other relatively mobile device that can be removed from a vehicle and contain the shown components. The mobile processing resource 334 can be a central processing unit inside the mobile device 326 and can process and provide instructions based on received input from the other components and from stored instructions in the mobile memory resource 332. The mobile networking interface 328 can be an interface to a larger network beyond the vehicle 102, such as the internet, or an intranet of other cars or vehicles or sensors outside the vehicle 102 and can also connect to the connection interface 314 of the visual signal system 302 to provide instructions. The mobile location system 330 can include positioning technology including use of global satellites to identify positions in longitude and latitude for navigation. The mobile memory resource 332 can be solid state memory or a hard-drive or any other means of storing data and instructions for the mobile processing resource 334.

FIG. 3B shows a simplified version of the visual signal system 302. Like numbered items are as described in FIG. 3A. As discussed above, the visual signal system 302 can include a light source 304, a ground projection adjustor 312, and a connection interface 314. As the visual signal system 302 is located within the vehicle 102, there can also be a direct connection to vehicle 102 components including the turn signal switch, brakes or gearshift position that can activate a turn signal projection of light, a braking projection of light or a projection indicating a vehicle is backing out respectively.

Figure 4:
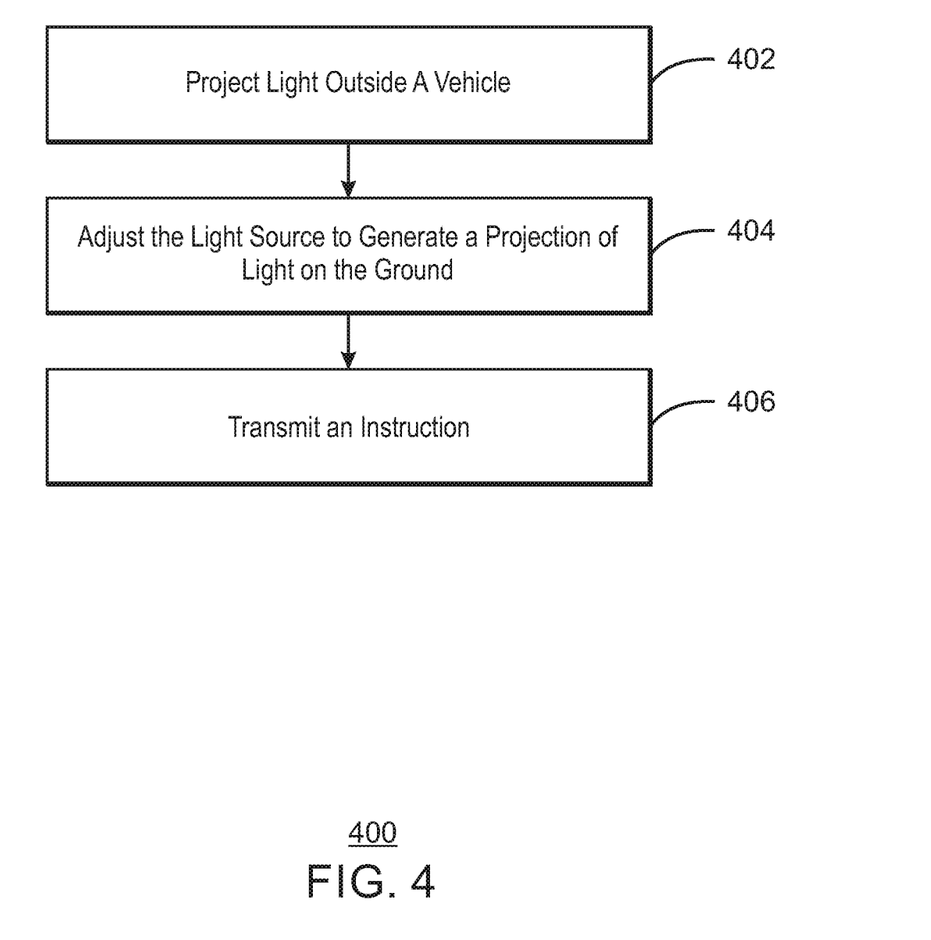
FIG. 4 is a drawing of an example method for a visual signal system in a vehicle to display a projected light on the ground near a car.

FIG. 4 shows a drawing of an example method 400 for a visual signal system in a vehicle to display a projected light on the ground near a car. Process flow begins at block 402.

At block 402, light is projected outside a vehicle. The light projected can be from a light source as described above. At block 404, the light source can be adjusted to generate a projection of light on the ground. The projection of light can be adjusted in shape, size, or color. In an example, the location of the projection of light can be moved based on detection by a detector that the ground location of projection can be in a blind-spot of an adjacent or approaching vehicle. At block 406, an instruction can be transmitted to the light sources and to the ground projection adjustor. The lights source can vary its intensity or ON vs OFF state based on an instruction. The instruction can be received based on an action of a driver or user. In an example, the driver can move a turn signal switch and create a mechanical instruction or digital instruction to be transmitted to the light source and ground projection adjustor wherein the projection of light is activated and targeted to a particular piece of ground or area on the ground. In an example, the instruction can vary the shape of the projection of light based on whether the instruction came from a right or left turn signal, from a brake pedal depression or some other similar driver action.

What is claimed is:

1. A visual signal system for a vehicle, comprising:
    a light source configured to project light outside of a vehicle;
    a ground projection adjustor configured to adjust the light source to be a projection of light on a ground adjacent the vehicle; and
    a connection interface configured to transmit instructions to the ground projection adjustor and the light source, wherein the connection interface processes a received instruction from a mobile device, the received instruction comprising a location for the light source to generate the projection of light on the ground, wherein the location for the light source is based on a mobile location system, and the mobile device comprises a mobile phone, a tablet, or a laptop.

2. The system of claim 1, wherein:
    the projection of light comprises at least one of length, width, shape, and any combination thereof, to be adjusted by the ground projection adjustor; and
    the projection of light is arrow shaped, stop sign, circle, yield symbol, and any combination thereof, to be adjusted by the ground projection adjustor.

3. The system of claim 1, comprising:
    a detector to transmit a blind-spot notification if a second vehicle is detected as being in a position relative to the vehicle wherein the projection of light is not visible; and
    a secondary light source to activate based on a detector transmission, where the secondary light source displays a secondary projection of light in a second location on the ground.

4. The system of claim 1, comprising:
    a detector to transmit a blind-spot notification if a second vehicle is detected as being in a position relative to the vehicle wherein the projection of light is not visible; and
    the ground projection adjustor moving at least one of, the projection of light, the light source, and any combination thereof, to project the projection of light into an available space outside the blind-spot.

5. The system of claim 1, wherein the connection interface processes a received instruction for the projection of light containing at least one of a relative location around the vehicle, longitude and latitude coordinates, a target of interest in a path of the vehicle, and any combination thereof.

6. The system of claim 1, wherein the light source is located in a rear of the vehicle and projects a stop symbol on the ground when the vehicle is braking.

7. The system of claim 1, wherein the light source is boated in a rear of the vehicle and projects a yield animation symbol on the ground when the vehicle is in reverse gear.

8. The system of claim 1, wherein the light source is a vehicle light adjusted by the ground projection adjustor to project symbols on the ground.

9. The system of claim 1, wherein the ground projection adjustor is rigid, manually adjustable, mechanically adjustable, adjustable through vehicle power, adjusted through a processed instruction received at the connection interface, and any combination thereof.

10. The system of claim 1, wherein the mobile device can be removed from the vehicle.

11. A method for visual signaling for a vehicle, comprising:
    projecting light outside of a vehicle with a light source;
    adjusting the light source to be a projection of light on a ground with a ground projection adjustor; and
    transmitting, with a connection interface, an instruction to the ground projection adjustor and the light source, wherein the connection interface processes a received instruction from a mobile device, the received instruction comprising a location for the light source to generate the projection of light on the ground, wherein the location for the light source is based on a mobile location system, and the mobile device comprises a mobile phone, a tablet, or a laptop.

12. The method of claim 11, wherein:
    the projection of light comprises at least one of length, width, shape, and any combination thereof, to be adjusted by the ground projection adjustor; and
    the projection of light is arrow shaped, stop sign, circle, yield symbol, and any combination thereof, to be adjusted by the ground projection adjustor.

13. The method of claim 11, comprising:
    transmitting, from a detector, a blind-spot notification if a second vehicle is detected as being in a position relative to the vehicle wherein the projection of light is not visible; and
    a secondary light source to activate based on a detector transmission, where the secondary light source displays a secondary projection of light in a second location on the ground.

14. The method of claim 11, comprising:
    a detector to transmit a blind-spot notification if a second vehicle is detected as being in a position relative to the vehicle wherein the projection of light is not visible; and
    the ground projection adjustor moving at least one of, the projection of light, the light source, and any combination thereof, to project the projection of light into an available space outside the blind-spot.

15. The method of claim 11, wherein the connection interface processes a received instruction for the projection of light containing at least one of a relative location around the vehicle, longitude and latitude coordinates, a target of interest in a path of the vehicle, and any combination thereof.

16. The method of claim 11, wherein the light source is located in a rear of the vehicle and projects a stop symbol on the ground when the vehicle is braking.

17. The method of claim 11, wherein the light source is located in a rear of the vehicle and projects a yield animation symbol on the ground when the vehicle is in reverse.

18. The method of claim 11, wherein the light source is a vehicle light adjusted by the ground projection adjustor to project symbols on the ground.

19. The method of claim 11, wherein the ground projection adjustor is rigid, manually adjustable, mechanically adjustable, adjustable through vehicle power, adjusted through a processed instruction received at the connection interface, or any combination thereof.

20. The method of claim 11, wherein the mobile device can be removed from the vehicle.

21. A vehicle based, visual signal system comprising:
a light source configured to project light outside of a vehicle;
a ground projection adjustor configured to adjust the light source to be a projection of light on a ground; and
a connection interface configured to transmit instructions to the ground projection adjustor and the light source, wherein the connection interface processes a received instruction from a mobile device, the received instruction comprising a location for the light source to generate the projection of light on the ground, wherein the location for the light source is based on a mobile location system, and the mobile device comprises a mobile phone, a tablet, or a laptop.

22. The vehicle of claim 21, wherein:
the projection of light comprises at least one of length, width, shape, and any combination thereof, to be adjusted by the ground projection adjustor; and
the projection of light is arrow shaped, stop sign, circle, yield symbol, and any combination thereof, to be adjusted by the ground projection adjustor.

23. The vehicle of claim 21, comprising:
a detector to transmit a blind-spot notification if a second vehicle is detected as being in a position relative to the vehicle wherein the projection of light is not visible; and
a secondary light source to activate based on a detector transmission, where the secondary light source displays a secondary projection of light in a second location on the ground.

24. The vehicle of claim 21, comprising:
a detector to transmit a blind-spot notification if a second vehicle is detected as being in a position relative to the vehicle wherein the projection of light is not visible; and
the ground projection adjustor moving at least one of, the projection of light, the light source, or any combination thereof, to project the projection of light into an available space outside the blind-spot.

25. The vehicle of claim 21, wherein the connection interface processes a received instruction for the projection of light containing at least one of a relative location around the vehicle, longitude and latitude coordinates, a target of interest in a path of the vehicle, and any combination thereof.

26. The vehicle of claim 21, wherein the light source is located in rear of the vehicle and projects a stop symbol on the ground when the vehicle is braking.

27. The vehicle of claim 21, wherein the light source is located in rear of the vehicle and projects a yield animation symbol on the ground when the vehicle is in reverse gear.

28. The vehicle of claim 21, wherein the light source is a vehicle light adjusted by the ground projection adjustor to project symbols on the ground.

29. The vehicle of claim 21, wherein the ground projection adjustor is rigid, manually adjustable, mechanically adjustable, adjustable through vehicle power, adjusted through a processed instruction received at the connection interface, or any combination thereof.

30. The vehicle of claim 21, wherein the mobile device can be removed from the vehicle.

* * * * *